Patented May 23, 1933

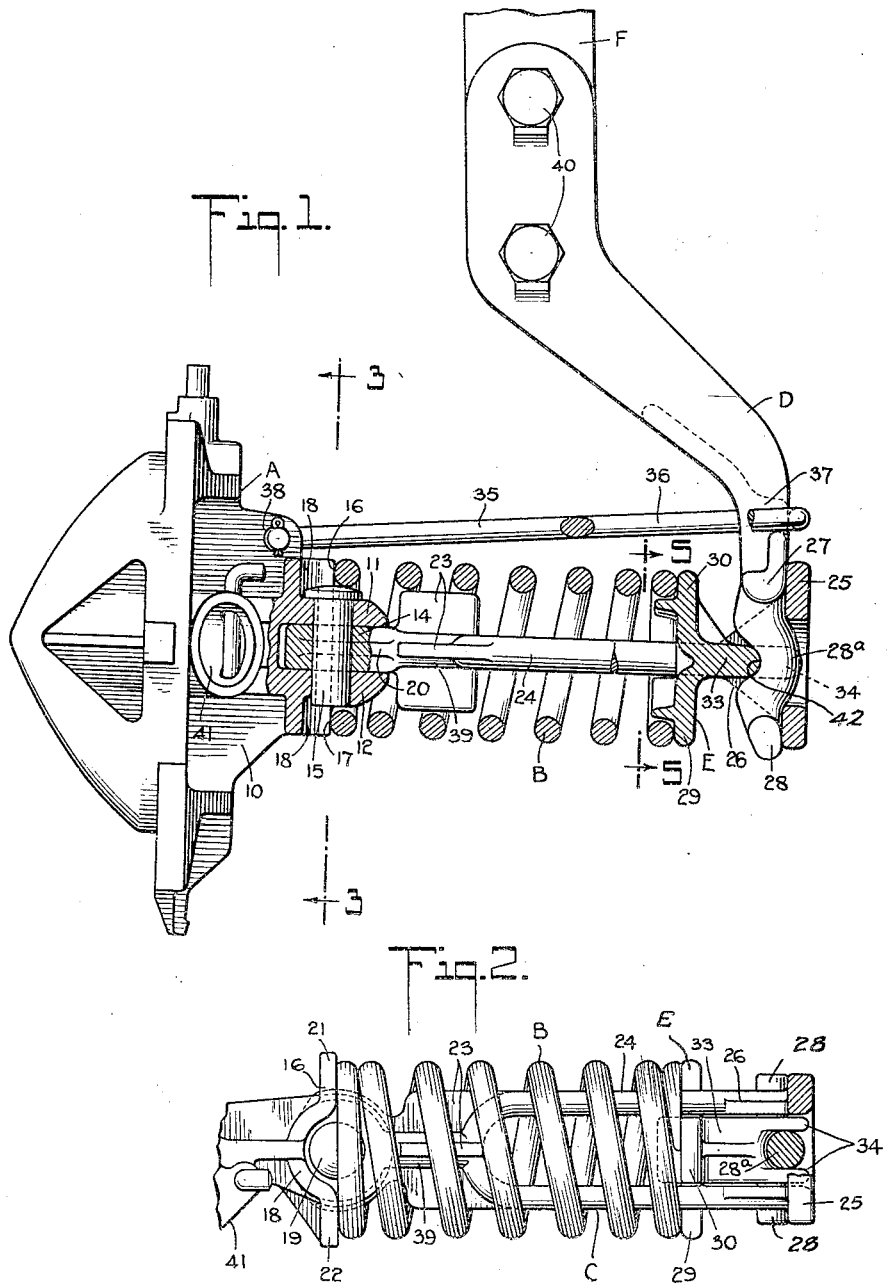

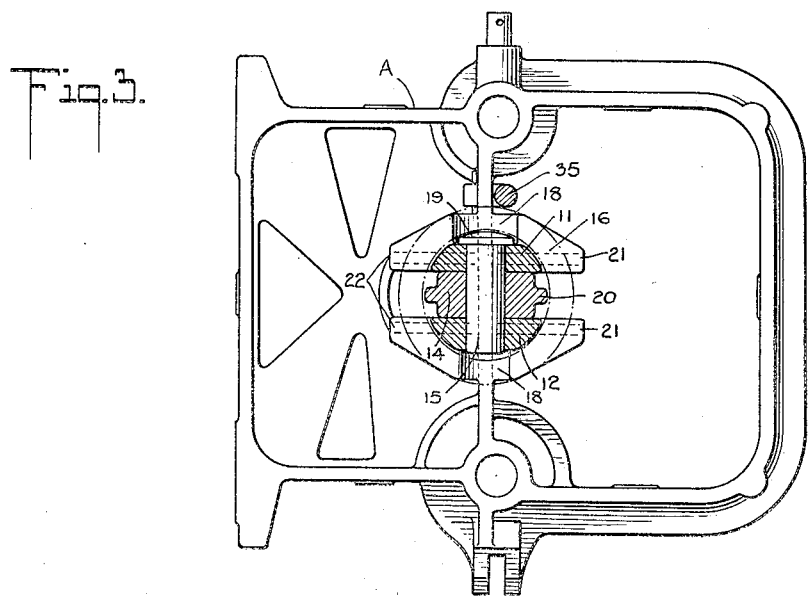
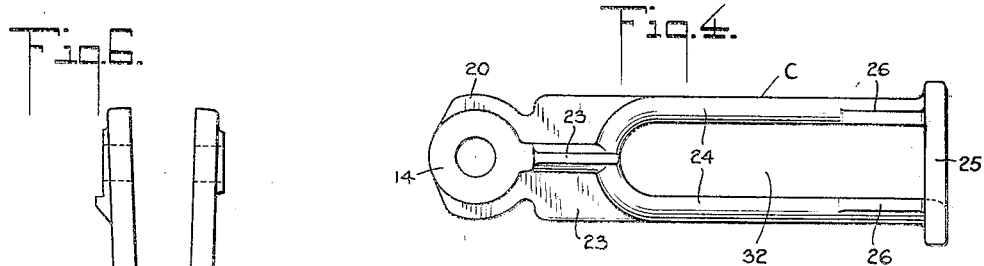
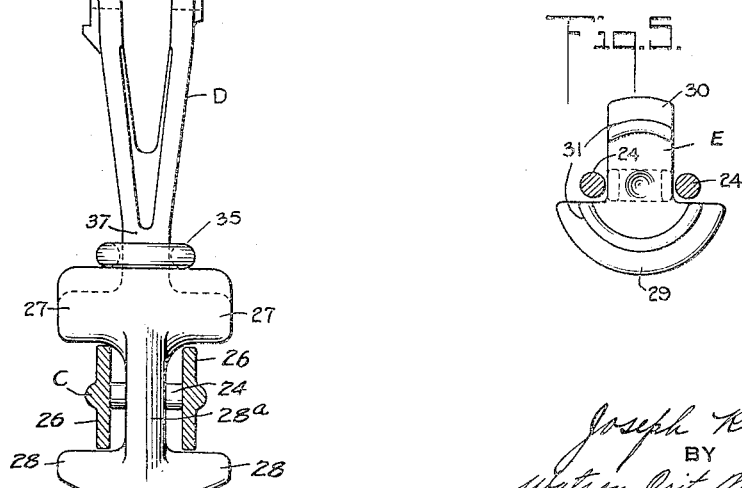

1,910,448

UNITED STATES PATENT OFFICE

JOSEPH ROBINSON, OF NEW YORK, N. Y.

AUTOMATIC TRAIN PIPE CONNECTER

Application filed September 14, 1929, Serial No. 392,704. Renewed May 15, 1931.

My invention relates to automatic train pipe connecters for coupling and uncoupling the train pipe hose of railway cars automatically. Among the objects of the invention are to simplify and improve the universal support for such connecters, and to mount the coupling head on the forward end of the support so that the head may pivot upon, or about, the forward end of the support. Another object is to provide means for preventing undue lateral deflection of the supporting spring when the coupling head moves on the pivot mentioned and forces the front end of the spring rearwardly. A further object is to provide a support of the spring in front of the bracket type in which the coupling head and supporting mechanism may be moved to a position at right angles to the track.

In the drawings, Figure 1 is a sectional side elevation of my improved connecter support;

Figure 2 is a sectional plan view thereof showing the relation between the spring supporting seat E and the bracket. In this view a part of the coupling head A is broken away;

Figure 3 is a sectional rear elevation on approximately the lines 3—3 of Figure 1 showing how the pivot joint at the forward end of my improved support is nestled in the spring;

Figure 4 is a plan view of the yoke or clevis forming a part of my improved support;

Figure 5 is a face view of the spring seat E. In this view the position of the straps or bars 24 of the yoke with relation to the seat are indicated, and Figure 6 is a rear view of the bracket D. In this view the supporting rod 35 is shown in its supporting relation to the bracket, and the clevis C, with the flanges 25 thereof cut away, is shown in its relation to the bracket when the connecter is in the normal uncoupled position.

It will be understood that any type of coupling head A may be carried by my improved support. The head may be either of the pin and funnel type, the wing type, or the horn and ring type here illustrated. A suitable shank 10 is connected with the coupling head. It may be cast integral therewith as shown or formed separately of the head and secured thereto. The shank includes a fork comprising the jaws 11 and 12 which are shaped to enter and quite closely receive the forward end of the buffer spring B, see particularly Figures 1 and 3. The forward end of the yoke C is provided with an eye 14 which rests within the fork mentioned, and is pivotally secured therein by a rugged steel pin 15 which passes downwardly through the portions 11 and 12 of the fork, and through the eye 14 of the yoke. Abutments or seats 16 and 17 are formed on the shank 10 and are preferably integral with the projections or jaws 11 and 12. These seats curve around the upper and lower ends of the pin 15 as illustrated at 18 in Figures 1, 2 and 3. It will be noted that the pivotal axis of the joint formed by these parts lies in the plane of the front face of the buffer spring B. Of course it may be otherwise positioned, but this is the position preferred. It will also be noticed that the head 19 of the pin 15 serves as a seat for the spring, supporting the latter against lateral movement, and that the spring holds the pin in the service position. Preferably the head of the pin is curved to conform to the inside diameter of the spring. Likewise as to the sides of the jaws 11 and 12, as indicated particularly in Figure 3. These parts fit quite closely but not tightly in the forward end of the spring B, and serve as a seat or seats therefor as heretofore stated. Preferably these parts are of substantial length and breadth to prevent excessive tilting of the head on and excessive wear between the parts of the pivot joint. For the same reason the pin 15 is of rugged construction. These cooperating parts are preferably machine finished.

A laterally projecting rib 20 is formed on the sides of the eye 14 of the yoke to cooperate with the projections 11 and 12 and with the pin 15 sufficiently support the spring in place. The outer ends of the abutments 16 and 17 extend laterally somewhat beyond the diameter of the spring forming fingers or lugs 21 and 22. These lugs act to force the spring rearwardly when the coupling head A moves on its pivot, as in coupler slip-bys, and they must, of course, be of sufficient length to prevent their rolling into the forward end of the spring when the head is pivoted to the extreme lateral positions.

When the coupling head A is rotated on the pivot pin 15 the lugs 21 and 22 tend to shift or deflect the forward end of the spring laterally on the yoke C as such end is compressed. To prevent this lateral deflection to an undue extent I provide the yoke with integrally formed laterally and vertically extending webs or other suitable supporting means 23 which guide the spring rearwardly along the clevis when the head moves on the pivot pin 15 compressing the spring B. The clevis C comprises preferably a single member having spaced straps or bars 24 which extend from adjacent the eye 14 rearwardly through the buffer spring B and span the lower end of the bracket D. At their rear end the straps terminate in a flange 25 which is normally held against the rear face of the bracket. At their points of connection to this flange the bars are provided with wide inclined guiding webs or flanges 26 which serve the double purpose of strengthening the connection between the flange and the bars and cooperate with the vertically spaced laterally extending projections 27 and 28 on the bracket to prevent undue rotation of the clevis and the coupling head A when in the normal uncoupled position shown in Figure 1. The vertically extending portion 28$^a$ of the bracket, lying between the projections 27 and 28, is round in cross section, particularly at its center, as shown in Figure 2, and this portion is curved or offset rearwardly to receive the spring seat E. The seat E comprises a block having a relatively wide lower side 29 and a relatively narrow upper side or projection 30, the latter projecting upwardly between the bars or straps 24, and both the upper and lower parts of the block having formed thereon a seat 31 to receive and support the rear end of the buffer spring B. Extending away from the rear side of the block, and positioned within the elongated opening 32, Figure 4, of the yoke or clevis C, I provide a finger or lug 33 having projections 34 which span the central portion 28$^a$ of the bracket, the contacting surfaces of these parts being flared in opposite directions. The buffer spring B surrounds the clevis C and is normally under compression. This compression is preferably such as to prevent movement of the coupling head A about its pivot except when the couplers of adjacent cars slip by, and it may, if desired, be sufficient to draw the flange 25 so firmly against the rear face of the bracket as to alone support the coupling head A, but I preferably provide a supporting rod 35 to assist in supporting the head. This rod includes an elongated perforated head 36 which extends around the cylindrically formed portion 37 of the bracket just above the upper projection 27 of the latter. At its forward end the rod passes loosely through a tie portion 38 on the head and is suitably anchored therein. The rod effectually cooperates with the flange 25 and the buffer spring B to yieldingly support the coupling head in the normal uncoupled position shown in Figure 1. Upon applying downward force to the coupling head the latter will move downwardly compressing the buffer spring and causing the flange to rock away from the rear face of the bracket at its lower end. When the coupling head is moved upwardly the rod does not of course offer any resistance thereto, and when the coupling head is pressed, as when cars come together, the rod slides along it on the upper laterally extending projections 27 of the bracket. At the same time the flange 25 and the guiding webs 26, move away from the rear side of the bracket thus releasing the universal joint and permitting free movement to the coupling head with the minimum of resistance thereto. This latter point is important. As is well known in this art, it is the sharp whipping movements of running cars that transmit the stresses through the usual universal joint in an automobile connecter to the connecter head which cause the heads to open up in service. The present invention produces a universal joint so sensitive that all of these stresses and strains are lost or absorbed by the universal joint. They do not get through the joint to the coupling head. For that reason my improved support assures that the joints between mated coupling heads will always be rigid and tight so long as the cars remain coupled. A further advantage of the universal joint of this application is that the coupling head A may be moved to a position substantially at a right angle to the track without damage to any of the parts. When car couplers slip by, which is frequent in industrial yards particularly, the connecter head must be capable of moving to an extreme lateral position in order to preserve itself against damage. The present invention permits that movement by two means. First, the universal joint formed by the parts at the lower end of the bracket D permits the coupling head to swing to a position at a right angle to the track. During such movement the rear end of the supporting rod 35 rotates, of course, around the bracket D at its point of connection thereto. The second means for permitting this movement of the coupling head is the pivot joint at the forward end of the spring B. Even if the universal joint at the bottom of the bracket did not permit the head to move to a position at a right angle to the track, but simply permitted it to move to all the ordinary positions of service, this pivot joint would provide the additional movement necessary. Therefore this pivot joint serves to connect the yoke C rigidly to the coupling head A except when the car couplers slip by, at which time it permits the head to rotate on its pivot and thus preserve itself against damage. This capability of the head to pivot on the yoke or support C when the couplers of adjacent cars slip by constitutes a feature of outstanding importance in the present invention. It frequently happens, especially in industrial yards where track curvature is particularly sharp, that the car couplers do not properly engage and couple, but instead slip by each other. When this happens, particularly if the slip-by is on the knuckle side of the couplers, damage to the connecter parts will occur unless the connecter heads can yield or pivot laterally relative to the supporting yoke C. It is only under the extreme conditions indicated, or when a powerful turning or pivotal thrust is exerted on the connecter head from some other cause not common to the ordinary service requirements of an automatic connecter, that the coupling head A is permitted by the spring B to pivot on its connection to the yoke C. The yoke, and the spring B, however, are free at all times to rock or oscillate on the bracket D on which they are mounted for such movement.

In assembling the parts in my invention, the supporting rod 35 is passed upwardly over the projections on the lower end of the bracket from one side of the latter and is then swung around to the position shown in Figure 1. Thereafter the bracket is passed downwardly between the straps 25 of the yoke C by turning the bracket until its projections 27 and 28 are parallel with the straps of the yoke. The bracket is then inserted and turned to face forwardly as shown in Figure 1, whereupon the spring seat E is passed upwardly through the opening 32 in the yoke or clevis C. The spring B is then slipped over the forward end of the yoke and mounted on the seat E. Suitable means is then applied to the spring to compress the latter sufficiently to permit the jaws 11 and 12 of the shank 10 to be passed over the eye 14 of the yoke and allow the pin 15 to drop into position. The spring is then released gradually whereupon it moves forward to the position shown in Figure 1, and the supporting rod is hooked into the head at 38. It will be noted that the bars 24 of the yoke or clevis C are joined at their forward end by a neck portion 39 away from which extend the webs 23, the eye 14 being formed integrally with this neck at the front end of the latter.

In the two views Figures 1 and 6 the construction of the bracket D is clearly illustrated. It spans the usual lug F formed integral with the car coupler and is rigidly bolted thereto by bolts or rivets 40. The rearward offset of the portion 28ª may of course be made to best suit the conditions of service. As illustrated it forms a seat 42 of considerable depth on the front face of the portion 28ª to receive the spring seat E. This arrangement has been found to be very satisfactory. The laterally extending projections 27 and 28 serve not only to position in cooperation with the inclined surfaces 26, the coupling head A with respect to the bracket D, but they serve also to prevent the connecter body from dropping off the bracket in event the spring B, or the supporting rod 35, should break. The flange 25 bears against the projections 27 and 28, as shown particularly in Figure 1. Its size and shape, and the size and shape of the projections 27 and 28 will, of course, be made such as to best suit the conditions of service. The usual train pipe hose, not shown, is preferably removably connected to the coupling head A at 41. This connection may be made in any suitable manner such for instance as shown in my co-pending application Serial #334,789 filed January 24th, 1929.

What I claim is:

1. An automatic train pipe connecter comprising in combination, a coupling head, a bracket having a laterally extending lug, a spring between the head and the bracket, and means connecting the head with the bracket, said means including a non-fluid conducting member connected to the head and having spaced portions which span said bracket, said portions being provided with inclined projections which engage said lug to position and support said head on the bracket when the head is forced forwardly by said spring.

2. An automatic train pipe connecter comprising in combination, a coupling head, a bracket having laterally extending vertically spaced projections, a vertically disposed elongated member between said projections, a seat mounted on the front face of said member for rocking movement thereon, a spring mounted on said seat for projecting said coupling head, and a non-fluid conducting yoke spanning said bracket and extending forwardly through said spring and anchored to said head, said yoke including spaced portions each of which is provided with an inclined surface for engaging the inner edges of said laterally extending vertically spaced projections on said bracket to properly position the coupling head with respect to the bracket.

3. An automatic train pipe connecter comprising in combination, a coupling head, a bracket provided with laterally extending lugs, a yoke spanning said bracket and extending forwardly thereof, said yoke including spaced portions which span said bracket and lie between said lugs and which are provided with inclined surfaces for engaging the lugs to position the rear end of the member on the bracket and prevent undue rotation of the coupling head when in the normal uncoupled position, said yoke being formed separately of the coupling head and suitably connected thereto, a spring seat positioned between said spaced portions and having a rearwardly extending projection mounted for rocking movement upon the front face of said bracket between said laterally extending lugs, the contacting surfaces of the seat and bracket being flared in opposite directions, and a spring interposed between said seat and said coupling head for projecting the latter and for maintaining said seat in position, said head being provided in front of said yoke with a hollow portion formed separately of the yoke for removably receiving a train pipe hose.

4. An automatic train pipe connecter comprising in combination, a coupling head having a shank provided with a seat, said shank including spaced portions, a bracket, an anchor member pivotally connected between said portions and extending rearwardly past said bracket, a buffer spring interposed between said seat and said bracket and having rocking movement upon the latter, and means positioned within said spring rearwardly of the head for preventing undue lateral deflection of said spring when said head pivots upon said pivot connection.

5. An automatic train pipe connecter comprising in combination, a coupling head having a shank provided with a seat, a bracket, a spring interposed between the bracket and the head and acting against said seat, a member within said spring and flexibly connecting the head with said bracket whereby the head may pivot laterally with respect to said member, and means mounted on said member and arranged within said spring to prevent lateral deflection of the forward coils of said spring when said head pivots, the front end of said spring serving to yieldingly maintain the face of said coupling head normally at substantially a right angle to the longitudinal axis of said member.

6. An automatic train pipe connecter comprising in combination, a coupling head, a bracket, a member extending from the coupling head rearwardly and comprising spaced portions lying on opposite sides of said bracket, a spring surrounding the member and interposed between the bracket and the head, and a supporting rod flexibly anchored to the coupling head and having an elongated perforated eye extending around the bracket above said spring, said eye and the space between said portions being of such size as to permit lateral rotary movement of said member and rod around said bracket.

7. An automatic train pipe connecter comprising in combination, a coupling head, a bracket, a spring between the bracket and the head for extending the head, and a pair of members extending from said head rearwardly and spanning said bracket, one of said members lying partly within said spring, and the other above said spring, each of said members having a space within which said bracket is received, said space being of such size as to permit both of said members to swing around the bracket to a position at right angles to the normal longitudinal direction of the connecter.

8. An automatic train pipe connecter comprising, in combination, a coupling head having a shank provided with a seat normally disposed in a plane at substantially a right angle to the longitudinal direction of the connecter, said shank including a lug, a bracket, an anchor member pivotally connected at its forward end to said lug and extending rearwardly past said bracket, a coiled buffer spring surrounding said member and acting to exert a thrust against said seat, said member adjacent its front end having means for engaging the coils of said spring to prevent undue lateral deflection of the spring when said head pivots upon said pivot connection compressing said spring.

9. An automatic train pipe connecter comprising, in combination, a coupling head having a rearwardly extending shank provided with a seat, said shank including spaced portions, an anchor member pivotally connected between said spaced portions and extending rearwardly of the head, said pivot connection including a pivot pin extending through said spaced portions and the front end of said anchor member, a coiled spring surrounding said anchor member and exerting a thrust against said seat, and means arranged at the forward portion of said spring to retain said pivot pin in position and to prevent undue lateral deflection of the forward coils of the spring when said head pivots on said pivot connection.

10. An automatic train pipe connecter comprising, in combination, a coupling head, a bracket, a member connected to said head and extending rearwardly and having spaced portions arranged on opposite sides of said bracket, a pivot block arranged in front of said bracket and acting against the same, a coiled spring arranged between said head and said block, said member and pivot block and spring being rotatable around said bracket into a position at a right angle to the normal longitudinal direction of the connecter.

11. An automatic train pipe connecter comprising, in combination, a coupling head having a lug on its rear side, a bracket, a member extending from the head rearwardly past said bracket and pivotally connected to said lug whereby the head may at certain times pivot on the forward end of said member, said member having rocking movement relative to the bracket, and a spring surrounding said member with its front coils spanning a portion of the pivotal connection between the member and the head, said spring being arranged to exert thrust against said head and serving to yieldingly support said head and to prevent pivotal movement thereof on said member except under abnormal pivotal thrust on the head as when the couplers of adjacent cars slip by.

In testimony whereof I hereunto affix my signature.

JOSEPH ROBINSON.